April 19, 1927.
C. GOTTFRIED
1,625,649
VIENNA ROLL FORMING MACHINE
Filed Dec. 17, 1925  2 Sheets-Sheet 2
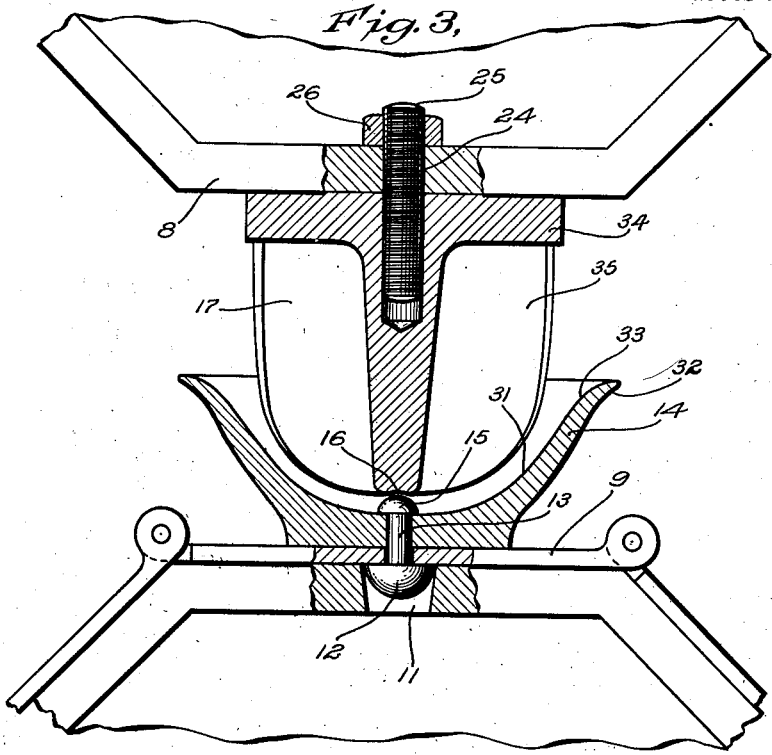
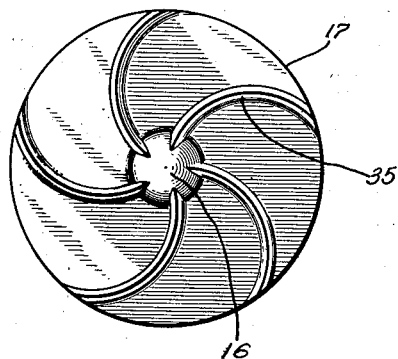
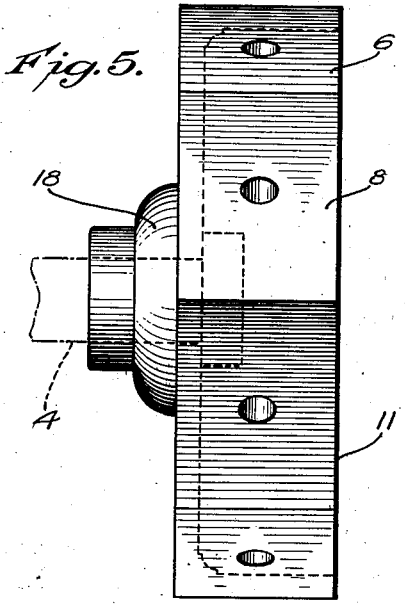
WITNESSES
INVENTOR
CHARLES GOTTFRIED
BY
ATTORNEYS Patented Apr. 19, 1927.

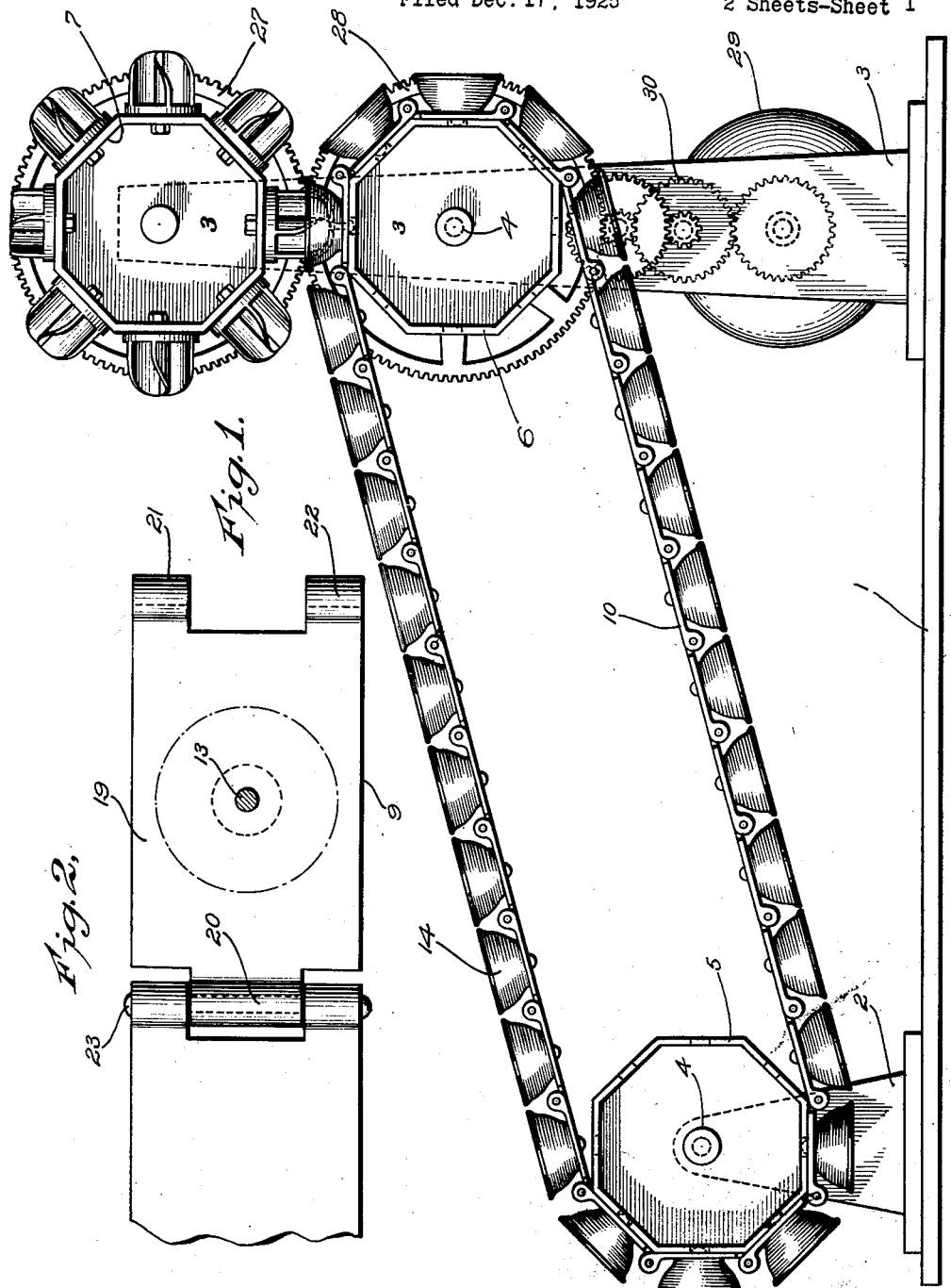

1,625,649

UNITED STATES PATENT OFFICE.

CHARLES GOTTFRIED, OF NEW YORK, N. Y.

VIENNA-ROLL-FORMING MACHINE.

Application filed December 17, 1925. Serial No. 76,047.

This invention relates to machines used in bakeries and particularly to an improved machine for forming rolls commonly known on the market as Vienna rolls and has for an object to provide a structure wherein the rolls may be formed properly and at a high speed.

Another object is to provide a Vienna roll forming machine wherein means are provided for rapidly feeding dough to a forming device so formed as to act on the dough in the desired manner and then eject the prepared roll.

A further object, more specifically, is to provide a Vienna roll forming machine wherein a series of buckets are provided for receiving balls of dough, the bucket structures being associated with means for pressing or forming the balls into Vienna roll structures immediately before they are discharged from the machine.

With the above recited and other objects in view, reference is had to the following specification and accompanying drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the accompanying drawings—

Figure 1 is a side view of an embodiment of the Vienna roll forming machine disclosing the invention.

Figure 2 is a top plan view of part of the chain shown in Figure 1, the cups being shown removed and the retaining rivet in section.

Figure 3 is an enlarged fragmentary sectional view through Figure 1, approximately on line 3—3.

Figure 4 is an enlarged end view of the forming die shown in Figures 1 and 3.

Figure 5 is an enlarged edge view of one of the belt carrying pulleys shown in Figure 1.

Referring to the accompanying drawings by numerals, 1 indicates a support of any desired kind which does not form any part of the present invention but acts to properly support the standards 2 and 3. Each of these standards carries a stub shaft 4 on which is rotatably mounted the respective pulley wheels 5 and 6. A third pulley wheel 7 is also provided and mounted on the standard 3 as shown in Figure 1. The pulley wheels 5 and 6 are identical, therefore, the description of one will apply to both.

As indicated in Figures 3 and 5, the pulley wheel 6 is polygonal with faces 8 of a proper size to receive the various links 9 of chain 10. The wheel 6 is provided with an aperture 11 in the center of each face 8, said aperture being adapted to receive the enlarged head 12 of the rivet 13 carried by each link 9. Each of the rivets 13 clamps a cup 14 to a link as clearly shown in Figure 3. The outer ends of the rivets 13 are provided with rather small heads 15 co-acting with the center section 16 of the forming die 17 whereby the dough is almost punctured at the center as the device operates. The wheel 6 is provided with an apertured hub 18 which accommodates the shaft 4, which shaft has an enlarged head on the inner end whereby the pulley wheel is held in proper position and properly supported on its standard. As the device operates, the enlarged heads 12 move into and out of the various apertures 11 whereby the chain is held on the respective pulley wheels and guided in its movement. It will be noted that the various links 9 are flat and fit flatwise against the faces 8. The links are formed as shown particularly in Figures 2 and 3. Each link is provided with a straight flat body 19, a central hinged knuckle 20 at one end and a pair of spaced hinged knuckles 21 and 22 at the opposite end. The knuckles 21 and 22 of one link are connected to the knuckle 20 of the next adjacent link by a suitable pintle 23. The links 9 are of sufficient length to slightly space the various cups 14 when the cups are aligned or arranged side by side as shown in Figure 1. Co-acting with the pulley 6 and the cups as they pass thereover, is a pulley 7 which is provided with a bore or aperture 24 in each of the square faces 8 for accommodating the screw 25 which is permanently screwed into the forming die as shown in Figure 3 and then a nut 26 is screwed thereon for clamping the forming die in position. The forming die 17 is clamped in the manner just described to each of the faces 8 of wheel 7 and as this wheel is of identical size and shape with wheel 6, tnere will be provided a proper synchrony between the two wheels. This is produced by a gear wheel 27 rigidly secured to the pulley wheel 7 and a gear wheel 28 rigidly secured to pulley 6. These two gears are continually in mesh and are of the same size so that the various flat faces 8 of the respective pulleys will come opposite each other successively as the pulleys rotate and, consequently, cause the various forming dies 17 to enter the various cups 14 as they move over pulley 6. A motor 29 of any desired kind, as for instance, an electric motor, is connected to gear wheel 28 through a suitable train of gears 30 whereby the parts are driven. It will be noted, of course, that the parts may be driven at different speeds and this variation of speed may be caused by varying the speed of the motor 28 or by changing certain of the gears of train 30.

The various cups 14 are formed as shown in Figure 3, namely, with a curved bottom 31 which may be struck on the arc of a circle or may be parabolic. However, the outer portion or edge 32 flares so that the surface 33 is a reverse curve to the bottom. It is to be noted that these curves may be changed to varying degrees but substantially the curve shown in Figure 3 is the most desirable as it allows the parts to co-act freely without the cup 14 and die 17 coming in contact. By having the outer edge flaring as described, a die may enter gradually one of the cups as the same approaches the highest position on pulley 6 and then gradually leave the cup while at the same time projecting to almost the bottom of the cup and thereby cutting and forming the die in the cup until it assumes the desired shape. All of the dies 17 are identical and are each provided with a base 34 merging into the central stem 16 and also into a plurality of curved blades 35 which are somewhat on the order of a periwinkle as indicated in Figure 4. It is evident, however, that the shape of these blades could be varied and they could be curved in some other manner and could be arranged in radial lines without departing from the spirit of the invention. The form shown in the accompanying drawings is considered the preferable form and in any event, the blades must be of appreciable depth, as for instance, from the outer end or central section 16 to the base 34 whereby they may freely enter the batch of dough in the cup so as to cut and form the same as desired.

In operation, when the parts are in the position shown in Figure 1, small batches or balls of dough are fed by the machine or mechanically placed in the cups 14 at or near the pulley wheel 5. The motor 29 is supported and as the chain 10 moves, the cups successively pass over the pulley 6 and as they pass over the highest point one of the dies 17 will enter the cup for pressing and cutting the ball of dough until it is formed in the desired shape for a Vienna roll. As the dies leave the cup the formed ball of dough is discharged onto a suitable receiving tray or in any desired receptacle, after which it is placed in the oven and cooked in the usual manner. It is understood, of course, that as long as the machine is in operation, batches or balls of dough of the proper consistency are placed in the cups 14 at some point before they reach the pulley 6. Usually the dough will leave the cups and the dies as the cups pass over the pulley 6. If desired, however, a wiper or resilient arm could be provided to force the balls off of the dies 17 as the dies emerge from the cups.

What I claim is:

1. A Vienna roll forming machine, comprising an endless belt structure formed with flat links, a plurality of cups carried by said belt structure and movable past a certain point, each of said links carrying a cup, each of said cups being adapted to receive a supply of dough before it passes said certain point, a pair of wheels for supporting said belt structure, said wheels having flat faces for receiving said links flatwise, one of said wheels being positioned adjacent said certain point, a series of dies co-acting with said cups and movable to said certain point and into the respective cups as they reach said certain point for forming the dough in the desired shape, and means for driving said belt structure and moving said dies in time relation.

2. In a Vienna roll forming machine, an endless chain formed with a series of flat links, each link having an aperture substantially in the center thereof, a cup mounted on each of said links, a rivet extending through part of the cup and through said aperture for connecting the cups to the links, each of said rivets having an enlarged head projecting beyond the links, a pair of polygonal-shaped pulleys for said chain, each of said pulleys having a series of apertures adapted to receive the enlarged heads of said rivets as the chain passes over whereby the various links will be centered on the different faces of the respective pulleys, a series of dies arranged adjacent one of said pulleys, and means for operating the pulleys and dies so that as the cups pass over a certain point the dies will enter the same for forming the dough therein into the proper shape.

3. In a Vienna roll forming machine, a pulley provided with a plurality of flat faces, each of said faces having an aperture substantially in the center and a co-acting cup chain positioned to pass over said pulley, said cup chain including a series of flat links, a cup mounted on each of said links, and a clamping member for each of the cups for clamping the cups in place, each of said clamping members having an enlarged portion adapted to move into the respective apertures of the pulley as the chain moves thereover whereby the links will be properly centered on the respective faces of the pulley.

4. In a Vienna roll forming machine, a series of cups, a series of dies, each of said cups having the surface of the edge curved in the opposite direction to the bottom of the cup whereby the dies may enter and leave in a rolling action without contacting with the cup.

CHARLES GOTTFRIED.